US007701413B2

(12) United States Patent
Moon

(10) Patent No.: US 7,701,413 B2
(45) Date of Patent: Apr. 20, 2010

(54) PLASMA DISPLAY APPARATUS AND DRIVING METHOD THEREOF

(75) Inventor: Seong Hak Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 1372 days.

(21) Appl. No.: 11/131,250

(22) Filed: May 18, 2005

(65) Prior Publication Data

US 2005/0259040 A1 Nov. 24, 2005

(30) Foreign Application Priority Data

May 19, 2004 (KR) ..................... 10-2004-0035570

(51) Int. Cl.
*G09G 3/10* (2006.01)
*G09G 5/00* (2006.01)
*G06F 3/038* (2006.01)

(52) U.S. Cl. ....................... 345/60; 315/169.4; 345/204

(58) Field of Classification Search .............. 315/169.4; 345/60-72, 204-206

See application file for complete search history.

(56) References Cited

U.S. PATENT DOCUMENTS 6,686,912 B1 * 2/2004 Kishi et al. ................. 345/211
6,961,031 B2 * 11/2005 Lee et al. ...................... 345/60
7,221,334 B2 * 5/2007 Lee et al. ...................... 345/60
7,511,707 B2 * 3/2009 Ito et al. ..................... 345/204
7,551,150 B2 * 6/2009 Moon .......................... 345/67
2004/0212316 A1 * 10/2004 Park ........................ 315/169.4
2005/0088376 A1 * 4/2005 Inoue et al. ................... 345/60

FOREIGN PATENT DOCUMENTS

| | | |
|---|---|---|
| EP | EP1548694 A1 | 6/2005 |
| EP | EP1580714 A2 | 9/2005 |
| KR | KR20030027173 | 4/2003 |
| KR | KR20040034275 | 4/2004 |
| WO | WO2004/032108 A1 | 4/2004 |

OTHER PUBLICATIONS

English translation of Korean Patent Publication No. KR20030027173 by Ji Seong Won published Apr. 7, 2003.*

* cited by examiner

*Primary Examiner*—Alexander S. Beck
(74) *Attorney, Agent, or Firm*—McKenna Long & Aldridge LLP

(57) ABSTRACT

The present invention relates to a plasma display apparatus and driving method thereof. According to the present invention, the plasma display apparatus includes a plasma display panel in which scan electrodes and sustain electrodes are formed, and a scan driving unit that applies a scan voltage and a sustain voltage whose absolute values are the same to the scan electrodes, wherein the sustain electrodes are kept to the ground.

7 Claims, 9 Drawing Sheets

PLASMA DISPLAY APPARATUS AND DRIVING METHOD THEREOF

CROSS-REFERENCES TO RELATED APPLICATIONS

This Nonprovisional application claims priority under 35 U.S.C. § 119(a) on Patent Application No. 10-2004-0035570 filed in Korea on May 19, 2004 the entire contents of which are hereby incorporated by reference.

BACKGROUND OF THE INVENTION

1. Field of the Invention

The present invention relates to a plasma display apparatus and driving method thereof.

2. Background of the Related Art

A plasma display panel (hereinafter, referred to as "PDP") is adapted to display an image including characters or graphics by light-emitting phosphors by ultraviolet of 147 nm generating upon discharging of inert mixed gas such as He+Xe or Ne+Xe.

FIG. 1 is a perspective view illustrating the construction of a three-electrode AC surface discharge type PDP having a discharge cell structure arranged in the form of matrix in the prior art.

Referring to FIG. 1, the three-electrode AC surface discharge type PDP 100 includes a scan electrodes 11*a* and a sustain electrodes 12*a* formed on an upper substrate 10, and an address electrodes 22 formed on a lower substrate 20. Each of the scan electrodes 11*a* and the sustain electrodes 12*a* are composed of a transparent electrode, e.g., indium-tin-oxide (ITO). Metal bus electrodes 11*b*, 12*b* for reducing resistance are formed in the scan electrodes 11*a* and the sustain electrodes 12*a*, respectively. The upper substrate 10 on which the scan electrodes 11*a* and the sustain electrodes 12*a* are formed are stacked with an upper dielectric layer 13*a* and a protection film 14. The upper dielectric layer 13*a* is accumulated with wall charges generated upon plasma discharging. A protection film 14 serves to prevent damage of the upper dielectric layer 13*a* due to sputtering generating upon plasma discharging, and also to increase emission efficiency of secondary electrons. The protection film 14 is usually formed of oxide magnesium (MgO).

On the other hand, on the lower substrate 20 on which an address electrode 22 is formed is formed a lower dielectric layer 13*b* and barrier ribs 21. On the surface of the lower dielectric layer 13*b* and the barrier ribs 21 is coated with a phosphor layer 23. The address electrodes 22 is formed in a direction to cross the scan electrodes 11*a* and the sustain electrodes 12*a*. The barrier ribs 21 are formed parallel to the address electrodes 22, and serve to prevent ultraviolet and a visible ray generated by discharging from leaking toward neighboring discharge cells. The phosphor layer 23 is light-emitted by ultraviolet generated upon plasma discharging to generate one of red R), green (G) and blue (B) visible rays. An inert mixed gas for gas discharging, such as He+Xe or Ne+Xe, is injected into discharge spaces of the discharge cell, which are defined between the upper substrate 10 and the barrier ribs 21 and between the lower substrate 20 and the barrier ribs 21. A method of driving the conventional PDP constructed above will now be described with reference to FIG. 2.

FIG. 2 shows a driving waveform for explaining a method of driving the conventional PDP. Referring to FIG. 2, the conventional PDP is driven with it being divided into a reset period for initializing the whole screen, an address period for selecting a cell, and a sustain period for maintaining discharge of a selected cell.

First, the reset period is driven with it being divided into a set-up period SU and a set-down period SD. In the set-up period SU, a ramp-up waveform Ramp-up is applied to all scan electrodes Y at the same time. The ramp-up waveform Ramp-up causes a discharge to occur within cells of the entire screen. Wall charges of the positive polarity are accumulated on address electrodes X and sustain electrode Z and wall charges of the negative polarity are accumulated on scan electrodes Y, by means of the set-up discharge. In the set-down period SD, after the ramp-up waveform is applied, a ramp-down waveform Ramp-dn in which a voltage starts to drop from a positive voltage lower than a peak voltage of the ramp-up waveform to a ground voltage GND or a predetermined negative voltage level causes a weak discharge to occur within the cells. Some of the wall charges that are excessively formed is erased. Wall charges of the degree in which an address discharge can be generated stably by means of the set-down discharge remain within the cells in a uniform manner.

In the address period, a scan pulse scan of the negative polarity is sequentially supplied to the scan electrodes Y. At the same time, a data pulse data of the positive polarity is applied to the address electrodes X in synchronization with the scan pulse. While a voltage difference between the scan pulse and the data pulse and a wall voltage generated in the reset period are added, an address discharge is generated within cells to which the data pulse is applied. Wall charges of the degree in which a discharge can be generated are formed within cells selected by the address discharge when a sustain voltage is applied. A positive DC voltage Zdc is applied to the sustain electrode Z during the set-down period and the address period so that an erroneous discharge with the scan electrodes Y is not generated by reducing a voltage difference with the scan electrodes Y.

In the sustain period, a sustain pulse sus is alternately applied to the scan electrodes Y and the sustain electrode Z. While a wall voltage within the cell and the sustain pulse are added, a sustain discharge, i.e., a display discharge is generated between the scan electrodes Y and the sustain electrode Z in the cell selected by the address discharge whenever the sustain pulse is applied. Further, after the sustain discharge is completed, an erase ramp waveform Ramp-ers having a small pulse width and a low voltage level is supplied to the sustain electrode Z, thereby erasing wall charges remaining within the cells of the whole screen.

Meanwhile, the operation of the driving apparatus of the PDP in the address period and the sustain period will now be described in more detail with reference to FIG. 3.

FIG. 3 is a circuit diagram of a scan electrode (Y) driving unit and a sustain electrode (Z) driving unit that operate in the address period and the sustain period of the conventional PDP.

First, if a channel corresponding to a first scan electrode Y1 is selected in a scan process of the address period, channels corresponding to the remaining scan electrodes Y2, Y3, . . . , Yn are not selected.

If the channel is selected as such, a second switching element 113-1 of a first scan driver 110-1 corresponding to the selected channel is turned on, and a switching element 120 for scan is turned on.

At the same time, first switching elements 111-2 to 111-*n* of scan drivers 110-2 to 110-*n* corresponding to the channels that are not selected and a switching element 130 for ground are turned on.

If the switching elements operate and a data pulse is applied to the address electrodes X1 to Xm as such, a path from the address electrodes X to the scan electrodes Y corresponding to the selected channel, the second switch of the scan driver of the selected channel and a scan voltage source −Vyscan is formed. The current flows through the path. If such a path is formed, a write operation is performed on a cell located at a first line.

Furthermore, in a sustain process, a first switching element 140 for sustain, second switching elements 113-1 to 113-*n* of the scan drivers 110-1 to 110-*n* connected to the entire scan electrodes Y, and a switching element 160 for ground are turned on. Accordingly, a path from a sustain voltage source Vsy to the scan electrodes Y1 to Yn, the sustain electrodes Z1 to Zn and the switching element 160 for ground is formed. A high current flows through the path.

Further, a second switching element 150 for sustain, the first switching elements 111-1 to 111-*n* of the entire scan drivers 110-1 to 110-*n* and the switching element 130 for ground are turned on. Therefore, a path from a sustain voltage source Vsz to Z electrodes Z1 to Zn, the Y electrodes, the first switching elements 111-1 to 111-*n* of the scan driver, the switching element 130 for ground and the ground is formed. A high current flows through the path.

As described above, in the sustain process, the high current flows toward the scan electrode driving unit 100 and the sustain electrode driving unit 200 through the scan electrodes Y and the sustain electrodes Z, which are located on the left and right sides of the screen. Thus, noise is generated due to EMI (Electro Magnetic Interference). Further, since the electrode driving units are located at both sides, the construction of the circuit is complicated.

Moreover, in the case where the scan electrode driving unit 100 and the sustain electrode driving unit 200 are formed on one PCB (Printed Circuit Board), relatively lots of circuits are disposed on the left side because the sustain electrode driving unit 200 on the right side is disposed in the scan electrode driving unit 100 on the left side.

What the scan electrode driving unit 100 and the sustain electrode driving unit 200 are formed on one PCB as such also causes interference or noise to be generated between the electrode driving units because a high current flows between the scan electrode driving unit 100 and the sustain electrode driving unit 200, as described in FIG. 3. Further, there are many problems in that heat generated in each electrode driving unit affects other electrode driving units, etc.

In addition, if the scan electrode driving unit 100 and the sustain electrode driving unit 200 are disposed on a single PCB, the sustain electrodes and electrode pads on the right side have to be connected using a wire or other conductive material. Thus, impedance may vary due to the wire or other conductive material, and a voltage drop is generated. Accordingly, there are problems in that the brightness on the left side of a screen and the brightness on the right side thereof are different, and the like.

SUMMARY OF THE INVENTION

Accordingly, the present invention has been made in view of the above problems occurring in the prior art, and it is an object of the present invention to provide a plasma display apparatus and driving method thereof, wherein a difference in the brightness in the right and left sides of a screen is prevented from occurring due to EMI and a voltage drop, which are generated upon driving, by improving a driving circuit that operates in an address period and a sustain period.

To achieve the above object, according to the present invention, there is provided a plasma display apparatus, including a plasma display panel in which scan electrodes and sustain electrodes are formed, and a scan driving unit that applies a scan voltage and a sustain voltage whose absolute values are the same to the scan electrodes. In this case, the sustain electrodes are kept to the ground.

The scan driving unit can include a driving unit that drives the scan electrodes, a first voltage application unit, which supplies a negative scan voltage to a selected scan electrode through the driving unit and supplies a negative sustain voltage to the entire scan electrodes through the driving unit, a first ground unit that sinks the current due to the negative scan voltage, and a second voltage application unit that applies a positive sustain voltage to the entire scan electrodes through the driving unit.

The driving unit, the first voltage application unit, the first ground unit and the second voltage application unit can be formed on a single board.

The driving unit can include a first switch and a second switch. In this case, the first and second switches are all turned on when being applied with the negative scan voltage from the first voltage application unit in a scan process. The first switch is turned on when being applied with the positive sustain voltage from the second voltage application unit in a sustain process. The second switch is turned on when being applied with the negative sustain voltage from the first voltage application unit in the sustain process.

The scan driving unit can include a driving unit that drives the scan electrodes, a third voltage application unit that applies a negative scan voltage to a selected scan electrode through the driving unit, a first voltage application unit that applies a negative sustain voltage to the entire scan electrodes through the driving unit, a first ground unit that sinks the current due to the negative scan voltage, and a second voltage application unit that applies a positive sustain voltage to the entire scan electrodes through the driving unit.

The first voltage application unit is turned off when the third voltage application unit applies the negative scan voltage to the selected scan electrode in a scan process.

The scan driving unit can further include a second ground unit that allows a pulse to become a ground level rapidly when the pulse shifts from a negative sustain pulse generated by the negative sustain voltage to a positive sustain pulse generated by the ground level or a positive sustain voltage.

According to the present invention, a first driving method of a plasma display apparatus includes the steps of applying a first negative voltage to a selected scan electrode in the address period, and applying a first positive voltage to the entire scan electrodes in the sustain period, and then applying the first negative voltage to the entire scan electrodes.

The first negative voltage and the first positive voltage an have the same value.

According to the present invention, a second driving method of a plasma display apparatus includes the steps of applying a second negative voltage to a selected scan electrode in the address period, and applying a first positive voltage to the entire scan electrodes in the sustain period, and then applying the second negative voltage to the entire scan electrodes.

The first positive voltage and the second negative voltage can have the same value.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

The present invention will now be described in detail in connection with preferred embodiments with reference to the accompanying drawings.

Figure 1:
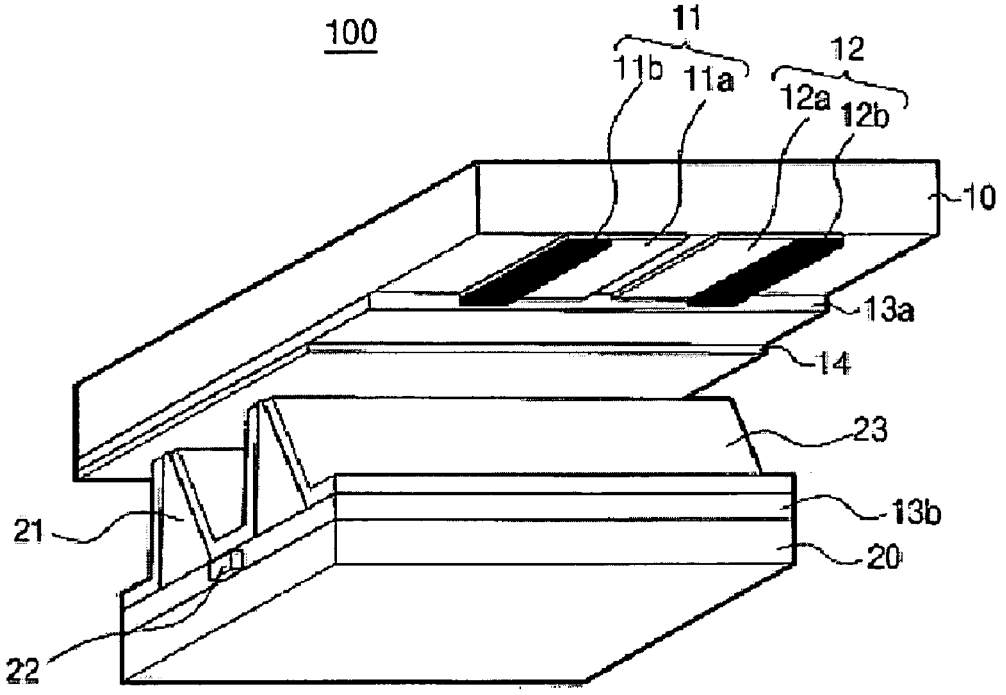
FIG. 1 is a perspective view illustrating the construction of a three-electrode AC surface discharge type PDP having a discharge cell structure arranged in the form of matrix in the prior art.
Figure 2:
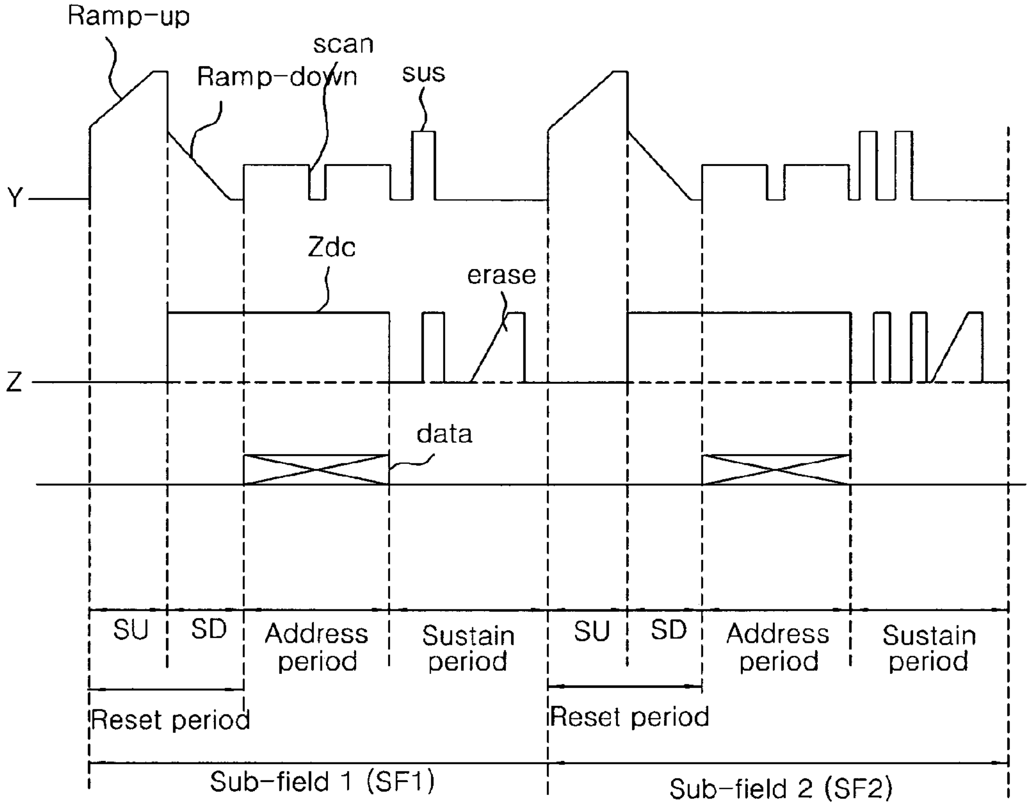
FIG. 2 shows a driving waveform for explaining a driving method of the conventional PDP.
Figure 3:
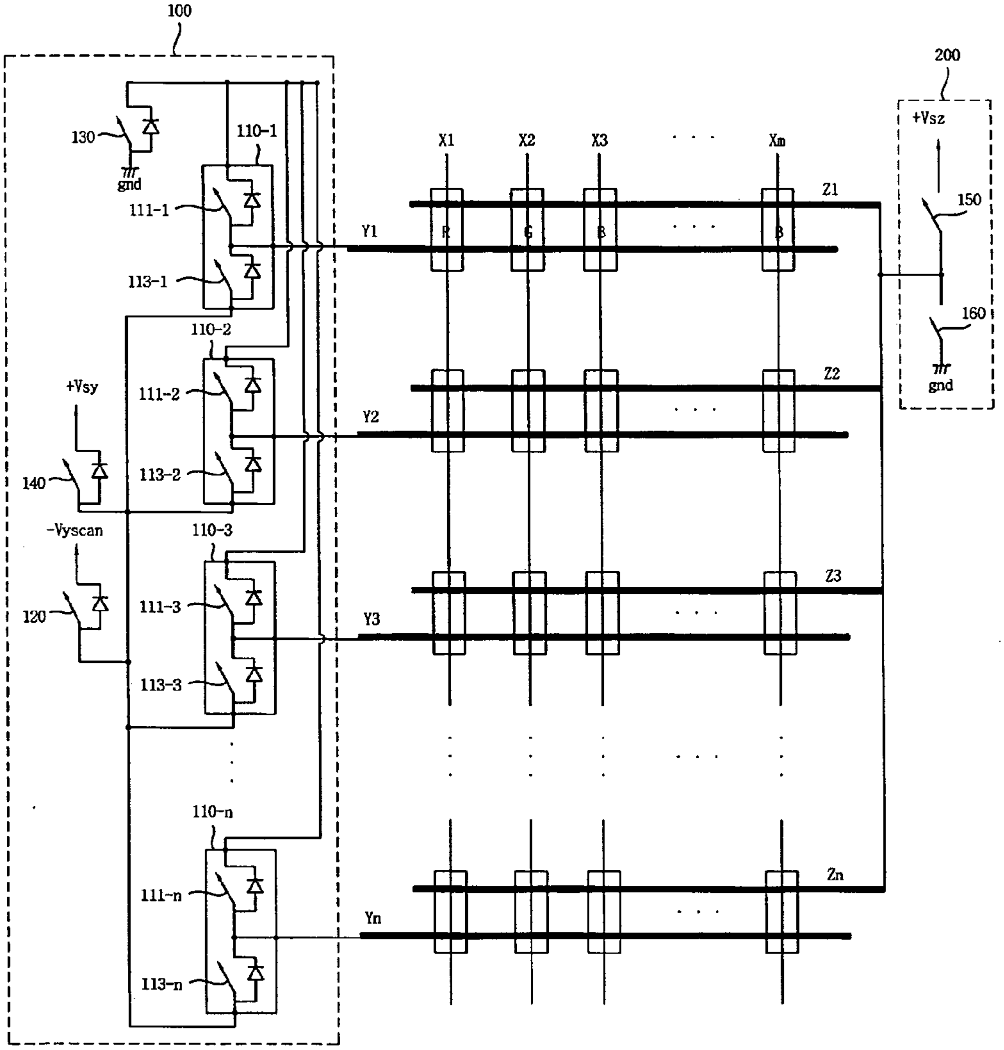
FIG. 3 is a circuit diagram of a scan electrode (Y) driving unit and a sustain electrode (Z) driving unit that operate in the address period and the sustain period of the conventional PDP.
Figure 4:
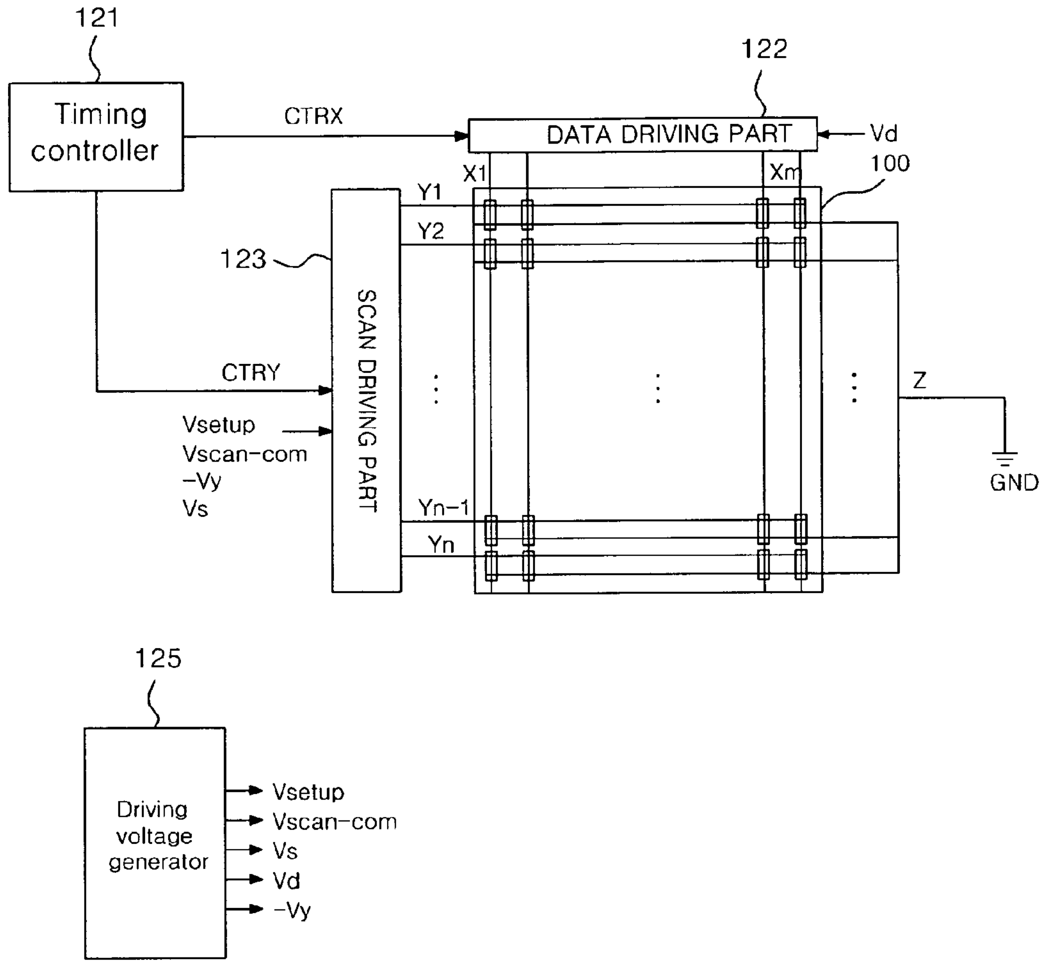
FIG. 4 is a block diagram showing the construction of a plasma display apparatus according to the present invention.

FIG. 4 is a block diagram showing the construction of a plasma display apparatus according to the present invention.

Referring to FIG. 4, the plasma display apparatus according to the present invention includes a PDP 100, a data driving unit 122 for supplying data to address electrodes X1 to Xm formed in a lower substrate (not shown) of the PDP 100, a scan driving unit 123 for driving scan electrodes Y1 to Yn, a timing control unit 121 for controlling the data driving unit 122 and the scan driving unit 123 when the PDP is driven, and a driving voltage generator 125 for supplying driving voltages necessary for the respective driving units 122 and 123. That is, the plasma display apparatus according to the present invention does not include a sustain driving unit for driving a sustain electrode Z, and the sustain electrode Z is formed to keep the ground GND.

The PDP 100 has an upper substrate (not shown) and a lower substrate (not shown) combined together with a predetermined gap therebetween. Further, a number of electrodes, e.g., the scan electrodes Y1 to Yn and the sustain electrode Z are formed in pairs on the upper substrate, and the address electrodes X1 to Xm are formed in such a way to cross the scan electrodes Y1 to Yn and the sustain electrode Z on the lower substrate.

The data driving unit 122 are supplied with data, which undergo inverse gamma correction and error diffusion through an inverse gamma correction circuit, an error diffusion circuit, etc., and are then mapped to respective sub-fields by means of a sub-field mapping circuit. The data driving unit 122 samples and latches data in response to a data timing control signal CTRX from the timing controller 121, and provides the data to the address electrodes X1 to Xm.

The scan driving unit 123 supplies a ramp-up waveform Ramp-up and a ramp-down waveform Ramp-down to the scan electrodes Y1 to Yn under the control of the timing controller 121 during the reset period. The scan driving unit 123 further sequentially supplies a scan pulse Sp of a negative scan voltage −Vs to the scan electrodes Y1 to Yn during the address period and supplies a positive sustain voltage Vs having the same voltage level as that of the negative scan voltage −Vs and a sustain pulse of the negative sustain voltage −Vs to the scan electrodes Y1 to Yn during the sustain period, under the control of the timing controller 121.

The timing controller 121 receives perpendicular/parallel sync signals and a clock signal, and generates timing control signals CTRX and CTRY for controlling an operating timing and synchronization of the respective driving units 122 and 123 in the reset period, the address period and the sustain period. The timing controller 121 then supplies the timing control signals CTRX and CTRY to corresponding driving units 122 and 123 in order to control the driving units 122 and 123.

Meanwhile, the data control signal CTRX includes a sampling clock for sampling data, a latch control signal, and a switch control signal for controlling an on/off time of an energy recovery circuit and a driving switch element. The scan control signal CTRY includes a switch control signal for controlling an on/off time of an energy recovery circuit and a driving switch element within the scan driving unit 123.

The driving voltage generator 125 generates a set-up voltage Vsetup, a scan-common voltage Vscan-com, a scan voltage −Vs, sustain voltages Vs and −Vs, a data voltage Vd, and so on. These driving voltages may vary depending upon the composition of a discharge gas, or the structure of a discharge cell.

In such a plasma display apparatus according to the present invention, an image consisting of frames is implemented by means of a combination of at least one or more sub-fields in which a driving pulse is applied to the address electrodes, the scan electrodes and the sustain electrodes in the reset period, the address period and the sustain period.

Meanwhile, the principle in which the plasma display apparatus according to the present invention operates in the address period and the sustain period will be below described with reference to FIGS. 5 to 7.

Figure 5:
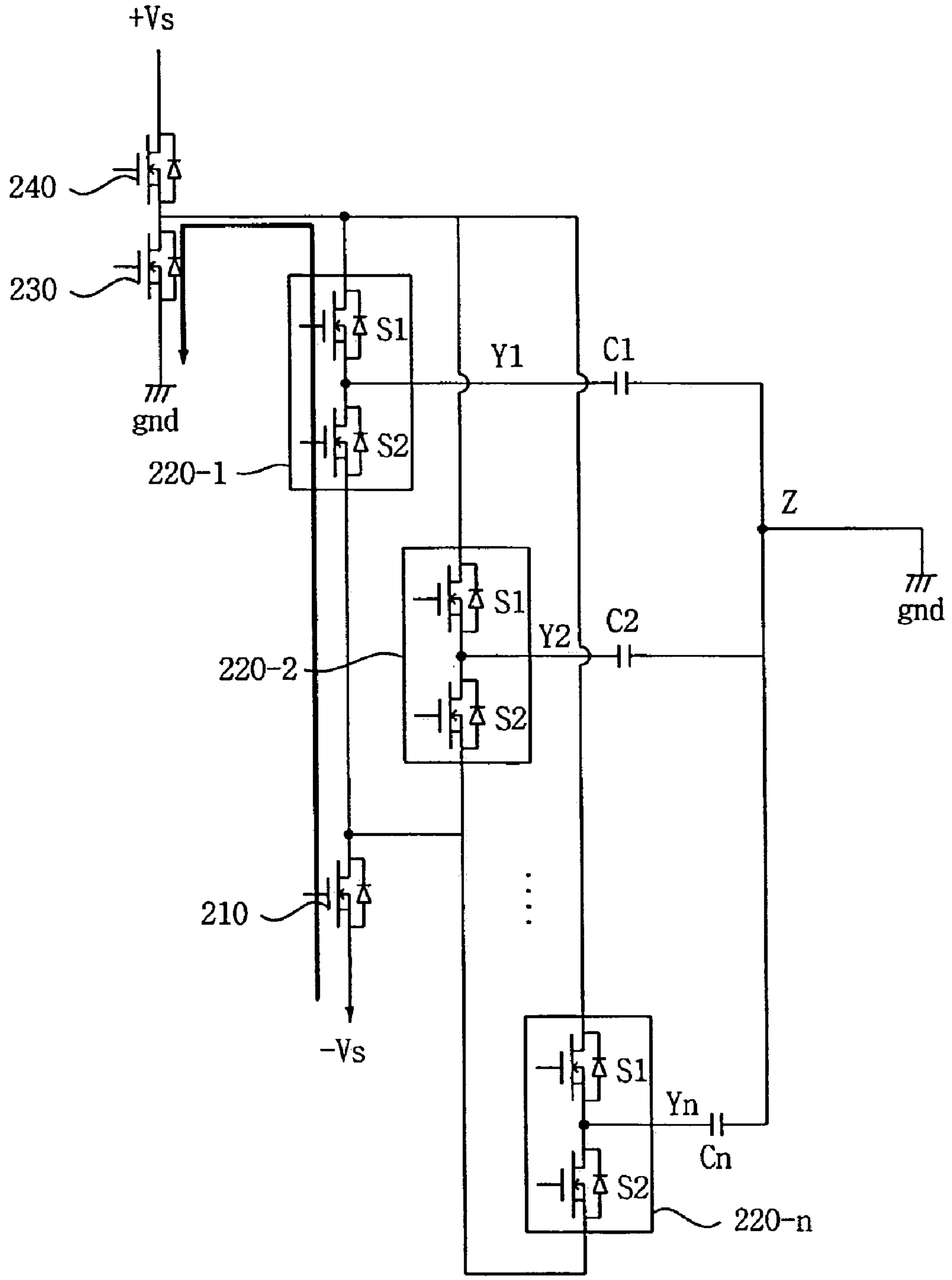
FIG. 5 is a circuit diagram for explaining a driving method of the plasma display apparatus according to the present invention in the address period.

FIG. 5 is a circuit diagram for explaining a driving method of the plasma display apparatus according to the present invention in the address period. As shown in FIG. 5, the sustain electrodes formed in the PDP according to the present invention are all connected to the ground.

First, in the address period, a negative sustain voltage source −Vs, a driving unit 220-1, a first ground unit 230 and the ground form a loop by means of the turning-on of a first voltage application unit 210, a driving unit 220-1 and a first ground unit 230. Accordingly, the negative sustain voltage source −Vs is applied to a sustain electrode Y1 connected to the driving unit 220-1 so that an address discharge is generated. Thus, a scan process is performed.

Figure 6:
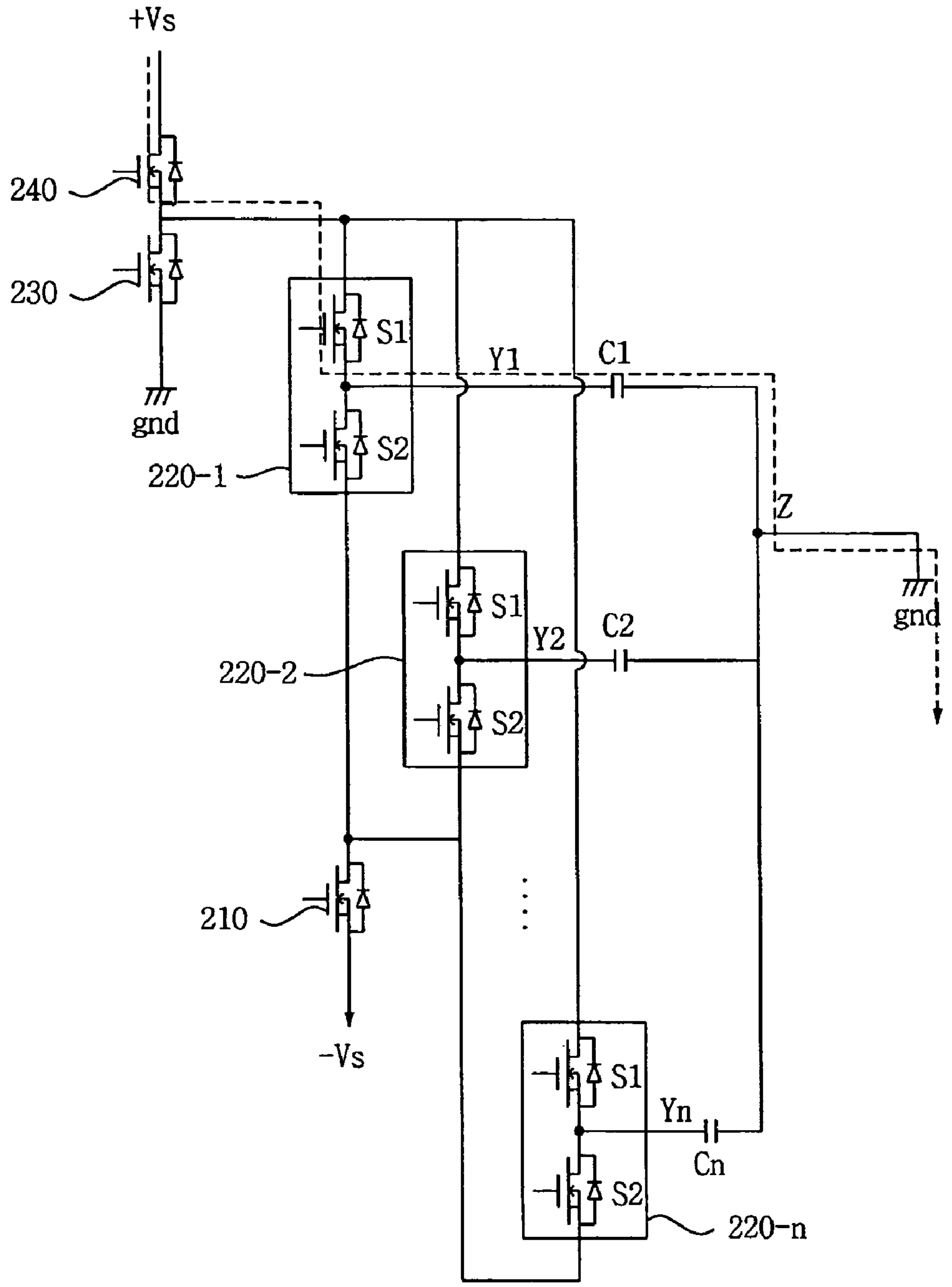
FIG. 6 is a circuit diagram for explaining a first operation in the driving method of the plasma display apparatus according to the present invention in the sustain period.

FIG. 6 is a circuit diagram for explaining a first operation in the driving method of the plasma display apparatus according to the present invention in the sustain period.

In the sustain period, a second voltage application unit 240 and a first switch S1 of the entire driving unit s 220-1 to **220-*n* are turned on, and a second switch S2 of the entire driving unit s 220-1 to 220-*n* and a first ground unit 230** are turned off.

Accordingly, a positive sustain voltage source +Vs, the second voltage application unit 240, the first switch S1 of the entire driving unit s 220-1 to **220-*n*, scan electrodes Y1, Y2, . . . Yn, which are respectively connected to the driving unit s, capacitors C1, C2**, . . . , Cn, a Z electrode and the ground form a loop.

Therefore, the positive sustain voltage +Vs is applied to the entire scan electrodes. That is, the sustain pulse is applied to the scan electrodes.

Figure 7:
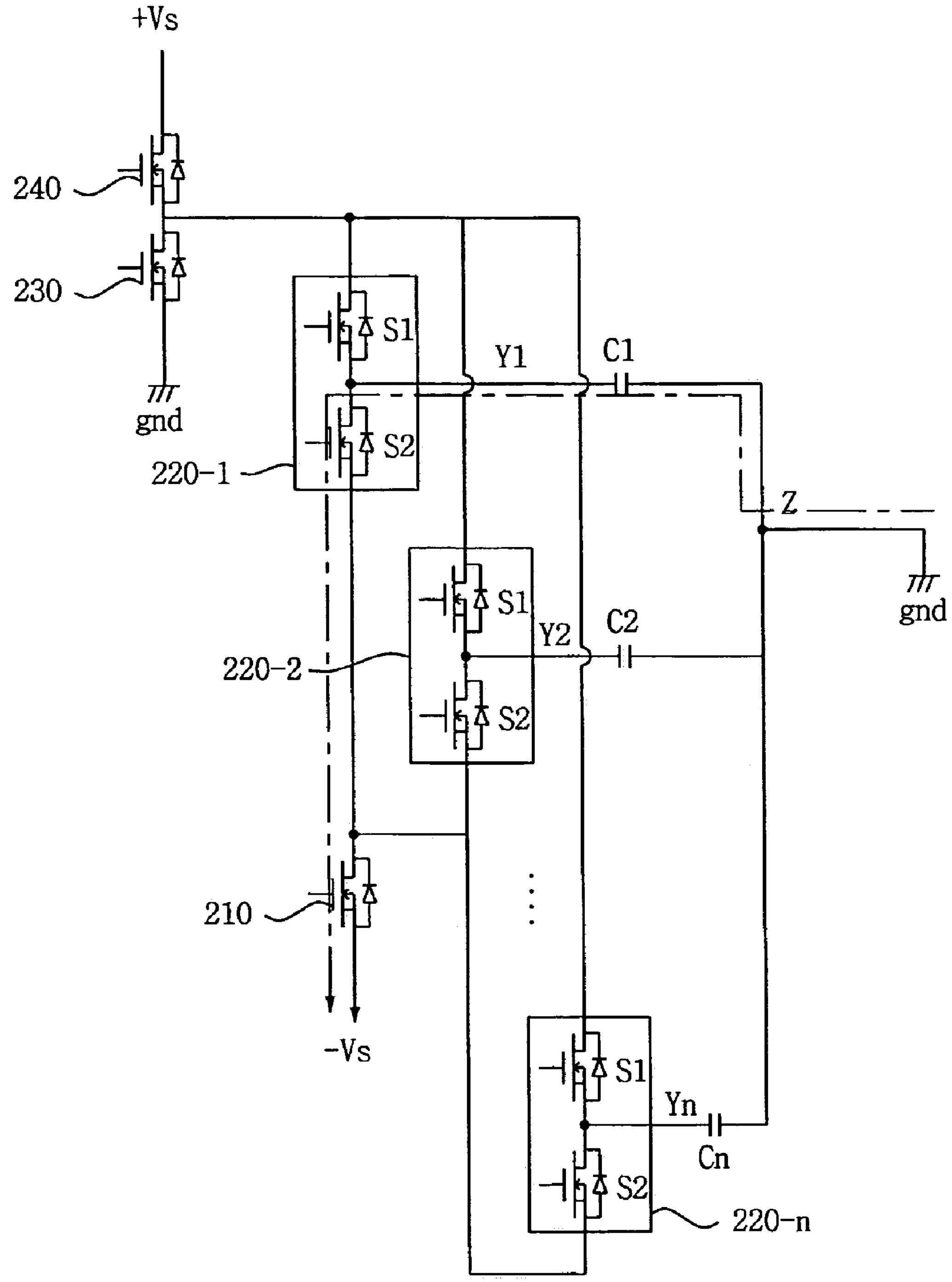
FIG. 7 is a circuit diagram for explaining a second operation in the driving method of the plasma display apparatus according to the present invention in the sustain period.

FIG. 7 is a circuit diagram for explaining a second operation in the driving method of the plasma display apparatus according to the present invention in the sustain period.

In FIG. 6, after the sustain pulse is applied to the scan electrodes by the first operation in the sustain period, the first voltage application unit 210 and the second switch S2 of the entire driving unit s 220-1 to **220-*n* are turned on, and the first switch S1 of the entire driving unit s 220-1 to 220-*n* and the first ground unit 230** are turned off.

Accordingly, the negative sustain voltage source −Vs, the first voltage application unit 210, the second switch S2 of the entire driving unit s 220-1 to **220-*n*, the scan electrodes Y1, Y2, . . . Yn connected to the respective driving unit s, respectively, the capacitors C1, C2**, . . . , Cn, the Z electrode and the ground form a loop.

Therefore, the negative sustain voltage −Vs is applied to the entire scan electrodes Y1, Y2, . . . Yn. That is, the sustain pulse is applied to the scan electrodes. In this case, what the negative sustain voltage −Vs is applied to the scan electrodes Y1, Y2, . . . Yn is the same as what the positive sustain voltage is applied to the sustain electrodes.

As such, in the plasma display apparatus according to the present invention, the scan voltage source and the sustain voltage source are used as the sustain voltage −Vs. Thus, there is an effect that the number of voltage sources can be reduced.

Meanwhile, in FIGS. 5 to 7, the capacitors C1, C2, . . . , Cn are equivalent capacitors, which are disposed between the Y electrodes and the Z electrode.

Figure 8:
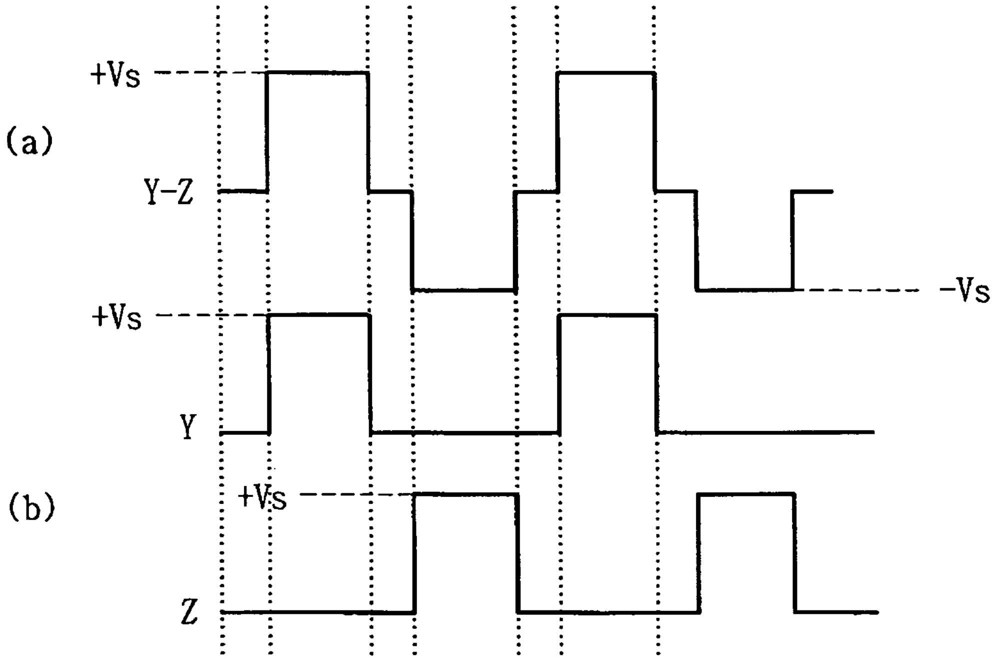
FIGS. 8*a* and 8*b* show waveforms depending upon the operation of the plasma display apparatus according to the present invention in the sustain period.

FIGS. **8*a* and 8*b* show waveforms depending upon the operation of the plasma display apparatus according to the present invention in the sustain period. FIG. 8*a* shows a waveform depending upon a voltage difference between the scan electrodes and the sustain electrodes. FIG. 8*b* show a waveform in each of the scan electrodes and the sustain electrodes in the waveform shown in FIG. 8*a***.

From FIG. **8*b***, it can be seen that the sustain pulse is alternately applied to the scan electrodes and the sustain electrodes by means of the plasma display apparatus according to the present invention, and a sustain discharge is generated accordingly.

In this plasma display apparatus according to the present invention, only the sustain electrode pad is connected to the ground without using the sustain electrode driving unit 200 that is located on the right side in the conventional driving apparatus. That is, the plasma display apparatus according to the present invention can prevent a voltage drop and can also prevent a brightness layer from being formed due to a conductive material because it does not need a wire although an electrode driving unit is formed on a single PCB.

Furthermore, not only the configuration of the entire electrode driving unit can be simplified, but also a voltage level of the whole circuit can be stabilized. Accordingly, an influence of EMI or electromagnetic wave interference can be reduced and problems caused by a high current can be solved.

Meanwhile, the plasma display apparatus according to the present invention can be driven with additional power if there is no scan or sustain driving margin. This will be below described with reference to FIG. 9.

Figure 9:
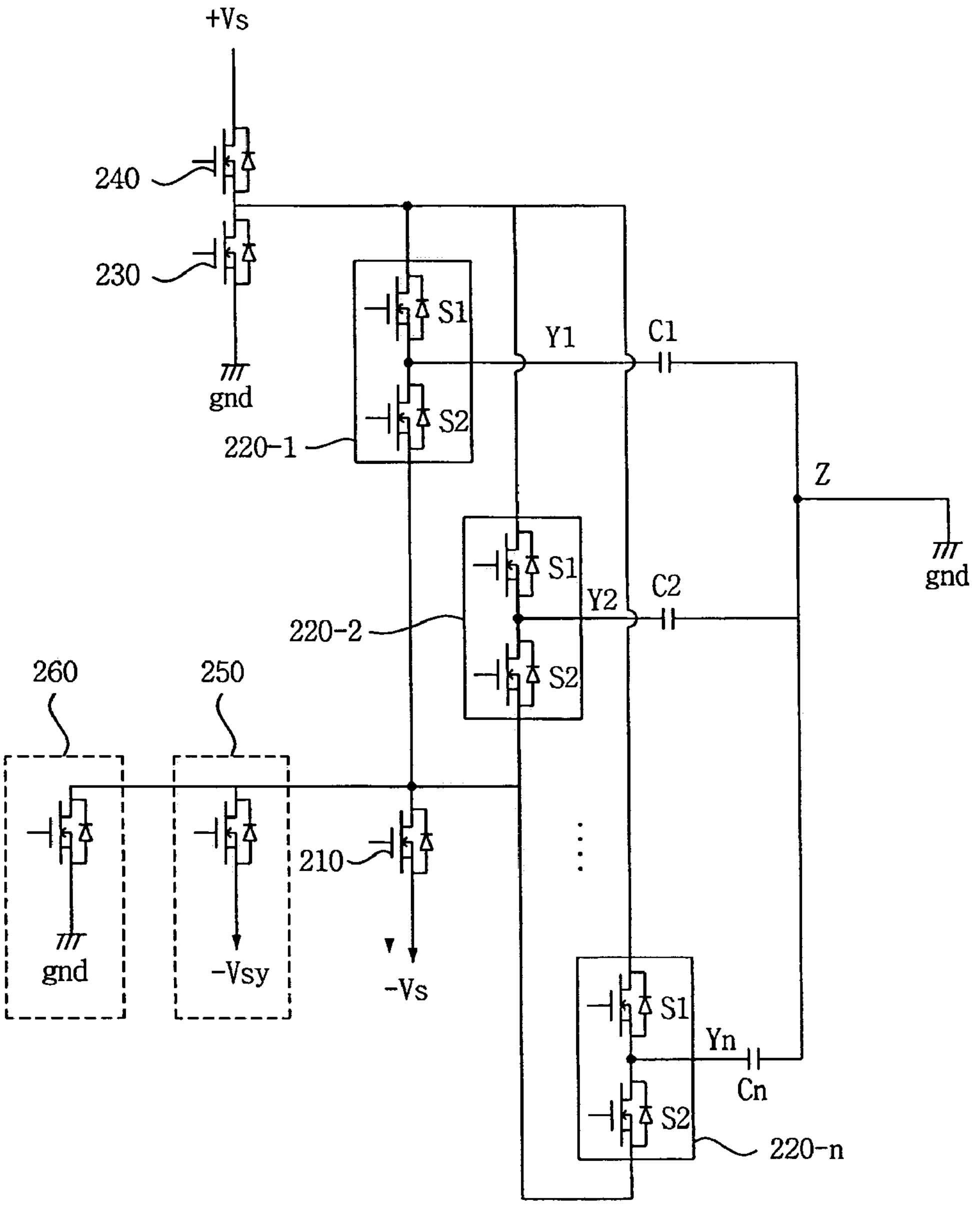
FIG. 9 is a circuit diagram for explaining another driving method of a plasma display apparatus according to the present invention in an address period and a sustain period.

FIG. 9 is a circuit diagram for explaining another driving method of a plasma display apparatus according to the present invention in an address period and a sustain period.

Referring to FIG. 9, the plasma display apparatus according to the present invention further includes a third voltage application unit 250, an additional scan voltage source −Vsy and a second ground unit 260. That is, the third voltage application unit 250 is turned in the scan process to apply the scan voltage source −Vsy to a selected scan electrode. In this case, the first voltage application unit 210 is turned off.

Further, the second ground unit 260 serves to allow a pulse to become a ground level rapidly when the pulse shifts from a negative sustain pulse to the ground level or a positive pulse.

As described above, according to the present invention, since a driving apparatus for driving a PDP is simplified, the manufacturing cost can be saved. Further, there is an effect in that EMI generating upon driving of a PDP can be reduced.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A plasma display apparatus, comprising:

a plasma display panel in which scan electrodes and sustain electrodes are formed; and a scan driving unit that applies a scan voltage and a sustain voltage to the scan electrodes when the absolute value of the scan voltage and the sustain voltage are the same, wherein the sustain electrodes are maintained in ground, wherein the scan driving unit includes:

a driving unit that drives the scan electrodes;

a first voltage application unit which supplies a negative scan voltage to a selected scan electrode through the driving unit and supplies a negative sustain voltage to the entire scan electrodes through the driving unit;

a first ground unit that sinks the current due to the negative scan voltage; and a second voltage application unit that applies a positive sustain voltage to the entire scan electrodes through the driving unit.

2. The plasma display apparatus as claimed in claim 1, wherein the driving unit, the first voltage application unit, the first ground unit and the second voltage application unit are formed on a single board.

3. The plasma display apparatus as claimed in claim 1, wherein the driving unit includes a first switch and a second switch, the first and second switches being all turned on when being applied with the negative scan voltage from the first voltage application unit in a scan process, the first switch being turned on when being applied with the positive sustain voltage from the second voltage application unit in a sustain process, and the second switch being turned on when being applied with the negative sustain voltage from the first voltage application unit in the sustain process.

4. The plasma display apparatus as claimed in claim 1, wherein the scan driving unit further includes a second ground unit that makes a pulse to be a ground level rapidly when the pulse shifts from a negative sustain pulse generated by the negative sustain voltage to a positive sustain pulse generated by the ground level or a positive sustain voltage.

5. A plasma display apparatus, comprising:

a plasma display panel in which scan electrodes and sustain electrodes are formed; and a scan driving unit that applies a scan voltage and a sustain voltage to the scan electrodes when the absolute value of the scan voltage and the sustain voltage are the same, wherein the sustain electrodes are maintained in ground voltage, wherein the scan driving unit includes:

a driving unit that drives the scan electrodes;

a third voltage application unit that applies a negative scan voltage to a selected scan electrode through the driving unit;

a first voltage application unit that applies a negative sustain voltage to the entire scan electrodes through the driving unit;

a first ground unit that sinks the current due to the negative scan voltage; and a second voltage application unit that applies a positive sustain voltage to the entire scan electrodes through the driving unit.

6. The plasma display apparatus as claimed in claim 5, wherein the first voltage application unit is turned off when the third voltage application unit applies the negative scan voltage to the selected scan electrode in a scan process.

7. The plasma display apparatus as claimed in claim 5, wherein the scan driving unit further includes a second ground unit that makes a pulse to be a ground level rapidly when the pulse shifts from a negative sustain pulse generated by the negative sustain voltage to a positive sustain pulse generated by the ground level or a positive sustain voltage.

* * * * *